(12) United States Patent
Saby et al.

(10) Patent No.: US 11,507,920 B2
(45) Date of Patent: Nov. 22, 2022

(54) SYSTEM AND METHOD OF DETERMINING AUTHENTICATION OF COMPONENTS OF INFORMATION HANDLING SYSTEMS

(71) Applicant: Dell Products L.P., Round Rock, TX (US)

(72) Inventors: Vinod Parackal Saby, Bangalore (IN); Wei G. Liu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 445 days.

(21) Appl. No.: 16/841,212

(22) Filed: Apr. 6, 2020

(65) Prior Publication Data

US 2021/0312376 A1 Oct. 7, 2021

(51) Int. Cl.
| | | |
|---|---|---|
| G06Q 10/08 | (2012.01) | |
| G06Q 30/00 | (2012.01) | |
| G06F 21/60 | (2013.01) | |
| G06F 16/2455 | (2019.01) | |
| G06Q 30/06 | (2012.01) | |

(52) U.S. Cl.
CPC ....... G06Q 10/087 (2013.01); G06F 16/2455 (2019.01); G06F 21/602 (2013.01); G06Q 30/0185 (2013.01); G06Q 30/0633 (2013.01); G06Q 2220/00 (2013.01)

(58) Field of Classification Search
CPC ............. G06Q 10/087; G06Q 30/0185; G06Q 30/0633; G06Q 2220/00; G06F 16/2455; G06F 21/602; G06F 21/64
USPC ......................... 340/568.1; 382/170; 713/189
See application file for complete search history.

(56) References Cited

U.S. PATENT DOCUMENTS

| | | | | |
|---|---|---|---|---|
| 8,212,674 B2 * | 7/2012 | Howarth | ................ | G06Q 10/08 |
| | | | | 340/568.1 |
| 2008/0273795 A1 * | 11/2008 | Ofek | ...................... | G06V 10/50 |
| | | | | 382/170 |
| 2018/0314578 A1 * | 11/2018 | Kondapi | ............. | G06F 11/0787 |

FOREIGN PATENT DOCUMENTS

JP 4219561 B2 * 2/2009 ............. G06F 21/34

OTHER PUBLICATIONS

7 Key Elements of a Successful Encryption Strategy, 2018 (Year: 2018).*

* cited by examiner

Primary Examiner — Tarek Elchanti
(74) Attorney, Agent, or Firm — McDermott Will & Emery LLP

(57) ABSTRACT

In one or more embodiments, one or more systems, one or more methods, and/or one or more processes may: query components of an information handling system; receive first multiple of information respectively from the components; retrieve encrypted inventory information associated with the components; decrypt the encrypted inventory information to determine second multiple of information associated with the components; display, via a user interface, the first multiple of information and the second multiple of information; determine if the first multiple of information differs from the second multiple of information; if so, display, via the user interface, at least one difference between the first multiple of information and the second multiple of information; and if not, via the user interface, information indicating that no discrepancy exists between the first multiple of information and the second multiple of information.

17 Claims, 10 Drawing Sheets

| Customer order item details | Factory assembly item details | Current inventory details | Hardware property matching | Hardware authenticated |
|---|---|---|---|---|
| Intel® Xeon® Gold 5122 CPU 1 3.60GHz | Intel® Xeon® Gold 5122 CPU 1 3.60GHz | Intel® Xeon® Gold 5122 CPU 1 3.60GHz | Yes | Yes |
| Network Interface | Part Number: AAA82 GR7CJR8N-WM | Part Number: AAA82 GR7CJR8N-WM | Yes | Yes |
| | SerialNumber:72 406 C5F | SerialNumber:72 406 C5F | Yes | |
| DDR Memory, 16GB, Hynix Semiconductor | Part Number: HMA82GR7CJR8N- WM Serial Number:72406 C5F Size:16384 MB | Part Number: HMA82GR7CJR8N- WM Serial Number:72406 C5F Size:16384 MB | Yes | Yes |
| Motherboard | PID: CN012345X789 0 A00 | PID: CN012345X789 0 A00 | Yes | |

| Customer order item details | Factory assembly item details | Current inventory details | Hardware property matching | Hardware authenticated |
|---|---|---|---|---|
| Intel® Xeon® Gold 5122 CPU 1 3.60GHz | Intel® Xeon® Gold 5122 CPU 1 3.60GHz | Intel® Xeon® Gold 5122 CPU 1 3.60GHz | Yes | Yes |
| Network Interface | Part Number: AAA82 GR7CJR8N-WM | Part Number: AAA82 GR7CJR7N-WM | No | Yes |
| | SerialNumber:72 406 C5F | SerialNumber:72 406 C5F | Yes | |
| DDR Memory, 16GB, Hynix Semiconductor | Part Number: HMA82GR7CJR8N- WM Serial Number:72406 C5F Size:16384 MB | Part Number: HMA82GR7CJR8N- WM Serial Number:72406 C5F Size:16384 MB | Yes | Yes |
| Motherboard | PID: CN012345X7890 A00 | PID: CN012345X7890 A00 | Yes | |

| Customer order item details | Factory assembly item details | Current inventory details | Hardware property matching | Hardware authenticated |
|---|---|---|---|---|
| Intel® Xeon® Gold 5122 CPU 1 3.60GHz | Intel® Xeon® Gold 5122 CPU 1 3.60GHz | Intel® Xeon® Silver 4210R CPU 1 2.40GHz | No | Yes |
| Network Interface | Part Number: AAA82 GR7CJR8N-WM | Part Number: AAA82 GR7CJR8N-WM | Yes | Yes |
| | SerialNumber:72 406 C5F | SerialNumber:72 406 C5F | Yes | |
| DDR Memory, 16GB, Hynix Semiconductor | Part Number: HMA82GR7CJR8N- WM Serial Number:72406 C5F Size:16384 MB | Part Number: HMA82GR7CJR8N- WM Serial Number:72406 C5F Size:16384 MB | Yes | Yes |
| Motherboard | PID: CN012345X7890 A00 | PID: CN012345X7890 A00 | Yes | |

SYSTEM AND METHOD OF DETERMINING AUTHENTICATION OF COMPONENTS OF INFORMATION HANDLING SYSTEMS

BACKGROUND

Field of the Disclosure

This disclosure relates generally to information handling systems and more particularly to authentication of components of information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling system product customers can typically believe that information handling system products received are what have been ordered. For example, information handling system product customers can compare a purchase order with what has been physically received. For instance, if the information handling system product has been compromised during transit from a manufacturer to an information handling system product customer, the information handling system product customer can have difficultly properly identifying one or more compromised information handling system components by physical appearance.

SUMMARY

In one or more embodiments, one or more systems, one or more methods, and/or one or more processes may query components of an information handling system; may receive first multiple of information respectively from the components; may retrieve encrypted inventory information associated with the components of the information handling system; may decrypt the encrypted inventory information to determine second multiple of information associated with the components of the information handling system; may display, via a user interface, the first multiple of information and the second multiple of information; may determine if the first multiple of information differs from the second multiple of information; if the first multiple of information differs from the second multiple of information, may display, via the user interface, at least one difference between the first multiple of information and the second multiple of information; and if the first multiple of information does not differ from the second multiple of information, may display, via the user interface, information indicating that no discrepancy exists between the first multiple of information and the second multiple of information.

In one or more embodiments, the one or more systems, the one or more methods, and/or the one or more processes may further receive, by a manufacturer via a network, an order for the information handling system, where the order includes the inventory of components. In one or more embodiments, retrieving the encrypted inventory information associated with the components of the information handling system may include retrieving, via a network, the encrypted inventory information associated with the components of the information handling system from a server.

In one or more embodiments, retrieving the encrypted inventory information associated with the components of the information handling system may include retrieving the encrypted inventory information associated with the components of the information handling system from a remote access controller of the information handling system. In one or more embodiments, decrypting the encrypted inventory information to determine the inventory information associated with the components of the information handling system may include utilizing a public encryption key of a manufacturer of the information handling system.

In one or more embodiments, first information of the first multiple of information includes first serial number information associated with a component of the components. In one or more embodiments, second information of the second multiple of information includes second serial number information associated with the component of the components. In one or more embodiments, determining if the first multiple of information differs from the second multiple of information may include determining if the first serial number information differs from the second serial number information.

In one or more embodiments, first information of the first multiple of information includes a first hash of firmware associated with a component of the components. In one or more embodiments, second information of the first multiple of information includes a second hash of firmware associated with the component of the components. In one or more embodiments, determining if the first multiple of information differs from the second multiple of information may include determining if the first hash differs from the second hash. In one or more embodiments, the one or more systems, the one or more methods, and/or the one or more processes may further compute the first hash of the firmware associated with the component of the components from the firmware associated with the component of the components.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which:

FIG. 5A illustrates an example of a user interface, according to one or more embodiments;

FIG. 5B illustrates a second example of a user interface, according to one or more embodiments;

FIG. 5C illustrates another example of a user interface, according to one or more embodiments.

DETAILED DESCRIPTION

Figure 1:
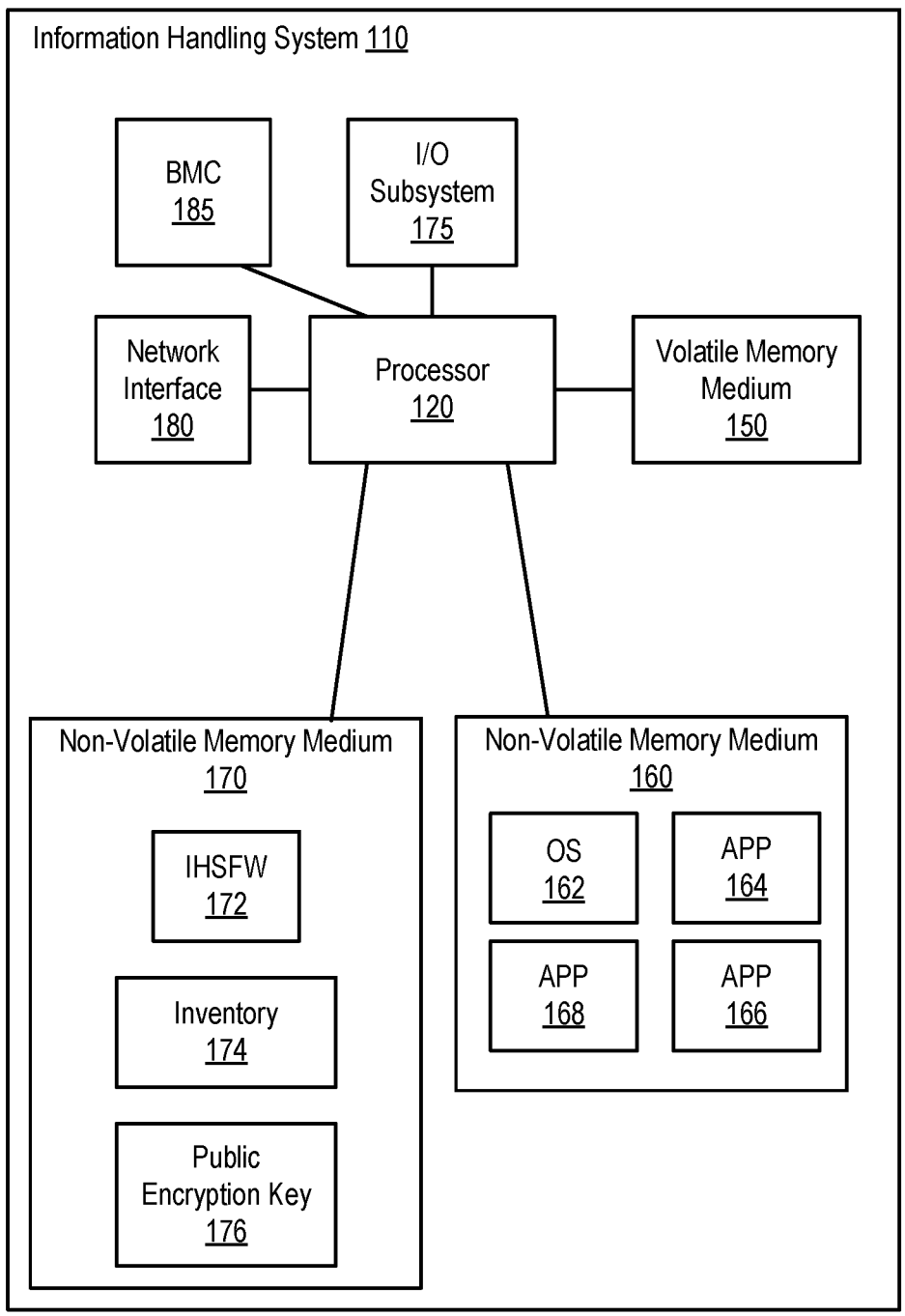
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, customers of information handling system products may determine that the information handling system products that were received are what had been ordered via comparing a purchase order with what are physically included by an information handling system. For example, if an information handling system has been tampered with during transit but includes components that appear to be authentic, it may be difficult to determine tampering by physical appearance. In one or more embodiments, an application may display a graphical user interface (GUI) that may display information, which shows one or more comparisons among what was ordered by the customer, what was assembled in the factory, and what was received by the customer.

In one or more embodiments, the GUI may display information that indicates one or more results of hardware and/or firmware that may or may not match. In one or more embodiments, the GUI may display information that indicates one or more authentications. For example, an authentication may indicate if any tampering occurred at a factory associated with a manufacturer of an information handling system. In one or more embodiments, the information of the report may vary based at least on a product (e.g., an information handling system) and/or based at least on an inventory of components of the product. For instance, the inventory of components of the product may include one or more processors, one or more memory media, one or more graphics processing units (GPUs), and/or one or more peripheral component interconnect express (PCIe) cards, among others.

In one or more embodiments, the application may be executed during pre-boot of the information handling system. For example, during a power on self test (POST), a message may be provided to a user about the application. For instance, the message may inform the user that key "F2" (of a keyboard associated with the information handling system) may be actuated to execute the application. In one or more embodiments, the information handling system may continue to boot if the user does not actuate key "F2". In one or more embodiments, the application may be accessed via a remote access controller. In one example, the remote access controller may be or include a baseboard management controller (BMC). In another example, the remote access controller may be or include an embedded controller (EC). In one or more embodiments, an EC may include one or more functionalities and/or one or more structures of a BMC.

In one or more embodiments, one or more factory scripts may collect content of an order (e.g., order details). For example, the one or more factory scripts may format the content of the order. In one instance, the one or more factory scripts may format the content of the order in a JavaScript Object Notation (JSON) format. In another instance, the one or more factory scripts may format the content of the order in an Extensible Markup Language (XML) format. In one or more embodiments, one or more product assembly factory scripts may collect inventory information associated with components of the information handling system. For example, the one or more product assembly factory scripts may format the inventory information. In one instance, the one or more product assembly factory scripts may format the inventory information in the JSON format. In another instance, the one or more product assembly factory scripts may format the inventory information in the XML format.

In one or more embodiments, content of the order and factory assembly information may be encrypted. For example, the content of the order and the factory assembly information may be encrypted as encrypted data. For instance, the encrypted data may be stored via a non-volatile memory medium of an information handling system associated with the order. As an example, if the order includes a server information handling system, the encrypted data may be stored via a non-volatile memory medium of the server information handling system. In one or more embodiments, the non-volatile memory medium of the server information handling system may include a protected non-volatile memory medium of the server information handling system. For example, the protected non-volatile memory medium of the server information handling system may include protected flash memory of the server information handling system.

In one or more embodiments, the encrypted data may be stored via an information handling system associated with a manufacturer of the server information handling system. For example, the encrypted data may be stored via a DELL™ support server and/or via a cloud-based storage solution associated with DELL™. In one or more embodiments, the encrypted data may be stored via a support server associated with the customer and/or via a cloud-based storage solution associated with the customer.

In one or more embodiments, a user associated with the customer or the customer may request comparison information. For example, the application may display the comparison information to the user associated with the customer or to the customer. In one or more embodiments, the server information handling system may receive the content of the order and/or the factory assembly information from the cloud-based storage solution associated with the manufacturer. In one or more embodiments, the server information handling system may receive the content of the order and/or the factory assembly information from the cloud-based storage solution associated with the customer. In one or more embodiments, the server information handling system may receive the content of the order and/or the factory assembly information from the support server associated with the manufacturer. In one or more embodiments, the server information handling system may receive the content of the order and/or the factory assembly information from the support server associated with the customer. In one or more embodiments, the server information handling system may receive the content of the order and/or the factory assembly information via a network.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I²C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, a network interface 180, and a BMC 185. As illustrated, volatile memory medium 150, non-volatile memory media 160 and 170, I/O subsystem 175, network interface 180, and BMC 185 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCIe root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RANI (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, one or more flowcharts, one or more methods, and/or one or more processes described herein. In one example, processor 120 may execute processor instructions from one or more of memory media 150, 160, and 170 in implementing one or more systems, one or more flowcharts, one or more methods, and/or one or more processes described herein. In another example, processor 120 may execute processor instructions via network interface 180 in implementing one or more systems, one or more flowcharts, one or more methods, and/or one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

As shown, non-volatile memory medium 170 may include an inventory 174. In one or more embodiments, inventory 174 may include an inventory of one or more components of IHS 110 and/or an inventory of one or more firmware. In one or more embodiments, inventory 174 may be written by a manufacturer of IHS 110. In one or more embodiments, non-volatile memory medium 170 may include a public encryption key 176. For example, public encryption key 176 may be written by the manufacturer of IHS 110. For instance, public encryption key 176 may be a public encryption key of the manufacturer of IHS 110. In one or more embodiments, information of inventory 174 may be encrypted. For example, information of inventory 174 may be encrypted via a private encryption key of the manufacturer of IHS 110. For instance, public encryption key 176 may be utilized to decrypt information of inventory 174 that was encrypted via the private encryption key of the manufacturer of IHS 110.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162.

In one or more embodiments, processor 120 and one or more components of IHS 110 may be included in a system-on-chip (SoC). For example, the SoC may include processor 120 and a platform controller hub (not specifically illustrated).

In one or more embodiments, BMC 185 may be or include a remote access controller. For example, the remote access controller may be or include a DELL™ Remote Access Controller (DRAC). In one or more embodiments, a remote access controller may be integrated into IHS 110. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, BMC 185 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 185 may be or include an application processor. In one example, BMC 185 may be or include an ARM Cortex-A processor. In another example, BMC 185 may be or include an Intel Atom processor. In one or more embodiments, BMC 185 may be or include one or more of a field programmable gate array (FPGA) and an ASIC, among others, configured, coded, and/or encoded with instructions in accordance with at least a portion of one or more of systems, one or more flowcharts, one or more methods, and/or one or more processes described herein.

Figure 2:
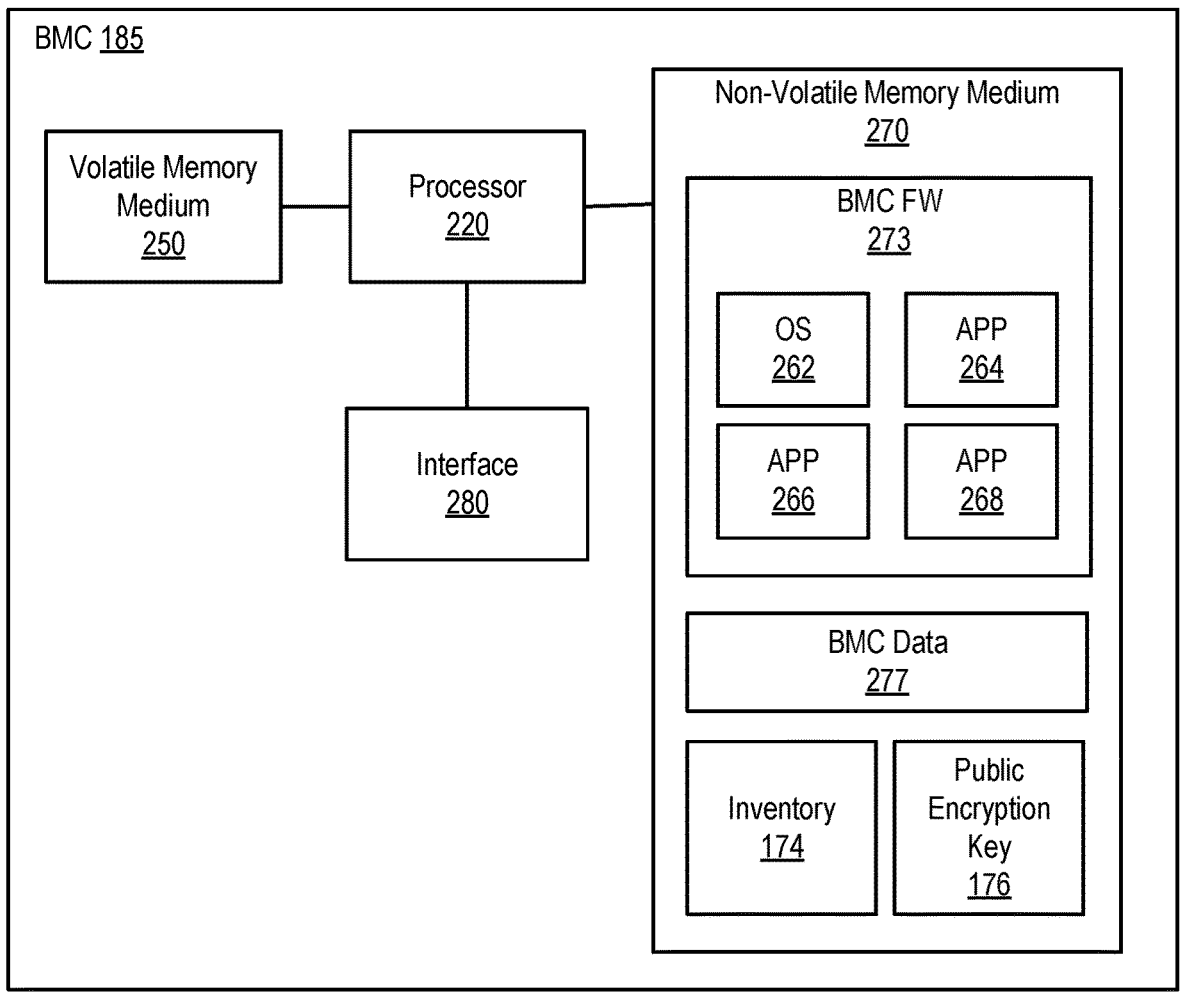
FIG. 2 illustrates an example of a baseboard management controller, according to one or more embodiments.

Turning now to FIG. 2, an example of a baseboard management controller is illustrated, according to one or more embodiments. As shown, BMC 185 may include a processor 220, a volatile memory medium 250, a non-volatile memory medium 270, and an interface 280. As illustrated, non-volatile memory medium 270 may include a BMC firmware (FW) 273, which may include an OS 262 and APPs 264-268, and may include BMC data 277. In one example, OS 262 may be or include a real-time operating system (RTOS). In a second example, OS 262 may be or include an Unix-like operating system. For instance, the Unix-like operating system may be or include Linux, FreeBSD, NetBSD, OpenBSD, Minix, Xinu, or Darwin, among others. In another example, OS 262 may be or include a portable operating system interface (POSIX) compliant operating system. As illustrated, non-volatile memory medium 270 may include inventory 174. As shown, non-volatile memory medium 270 may include public encryption key 176.

In one or more embodiments, interface 280 may include circuitry that enables communicatively coupling to one or more devices. In one example, interface 280 may include circuitry that enables communicatively coupling to one or more buses. For instance, the one or more buses may include one or more buses described herein, among others. In a second example, interface 280 may include circuitry that enables one or more interrupt signals to be received. In one instance, interface 280 may include general purpose input/output (GPIO) circuitry, and the GPIO circuitry may enable one or more interrupt signals to be received and/or provided via at least one interrupt line. In another instance, interface 280 may include GPIO circuitry that may enable BMC 185 to provide and/or receive signals associated with other circuitry (e.g., diagnostic circuitry, etc.). In a third example, interface 280 may include circuitry that enables communicatively coupling to one or more networks. In one instance, interface 280 may include circuitry that enables communicatively coupling to network interface 180. In another example, interface 280 may include a network interface.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In one or more embodiments, processor 220 may execute instructions in accordance with at least a portion of one or more systems, one or more flowcharts, one or more methods, and/or one or more processes described herein. For example, non-volatile memory medium 270 and/or volatile memory medium 250 may store instructions that may be executable in accordance with at least a portion of one or more systems, flowcharts, one or more methods, and/or one or more processes described herein. In one or more embodiments, processor 220 may execute instructions in accordance with at least a portion of one or more of systems, flowcharts, methods, and/or processes described herein. For example, non-volatile memory medium 270 and/or volatile memory medium 250 may store instructions that may be executable in accordance with at least a portion of one or more of systems, flowcharts, methods, and/or processes described herein. In one or more embodiments, processor 220 may utilize BMC data 277. In one example, processor 220 may utilize BMC data 277 via non-volatile memory medium 270. In another example, one or more portions of BMC data 277 may be transferred to volatile memory medium 250, and processor 220 may utilize BMC data 277 via volatile memory medium 250.

Figure 3A:
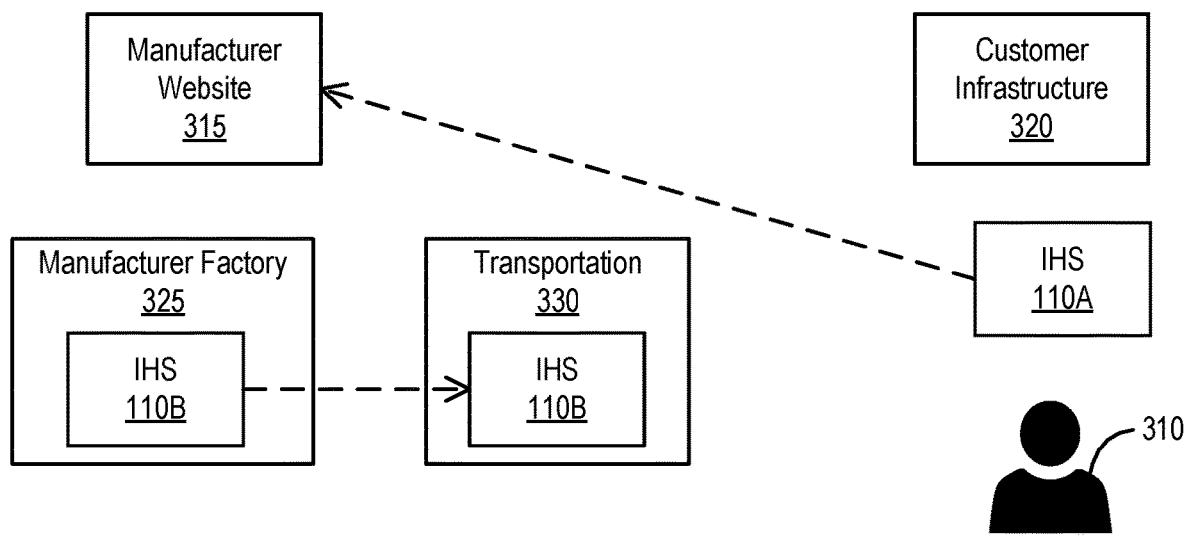
FIG. 3A illustrates an example of a supply chain, according to one or more embodiments.

Turning now to FIG. 3A, an example of a supply chain is illustrated, according to one or more embodiments. As shown, a customer 310 may utilize an IHS 110A to access a manufacturer website 315. For example, customer 310 may utilize IHS 110A to access manufacturer website 315 via a network (not specifically illustrated). In one or more embodiments, customer 310 may utilize IHS 110A to order an IHS 110B from manufacturer website 315. For example, an order of IHS 110B may include one or more components of IHS 110B. For instance, the one or more components of IHS 110B may include firmware, a processor, memory, a drive, and a network interface, among others. In one or more embodiments, customer 310 may be a person. In one or more embodiments, customer 310 may represent an entity. For example, the entity may include a company. As illustrated, a manufacturer factory 325 may manufacture IHS 110B. As shown, manufacturer factory 325 may provide IHS 110B to a transportation 330. In one or more embodiments, transportation 330 may include a shipping entity. For example, the shipping entity may deliver IHS 110B to customer 310. For instance, the shipping entity may deliver IHS 110B to a physical address associated with customer 310.

Figure 3B:
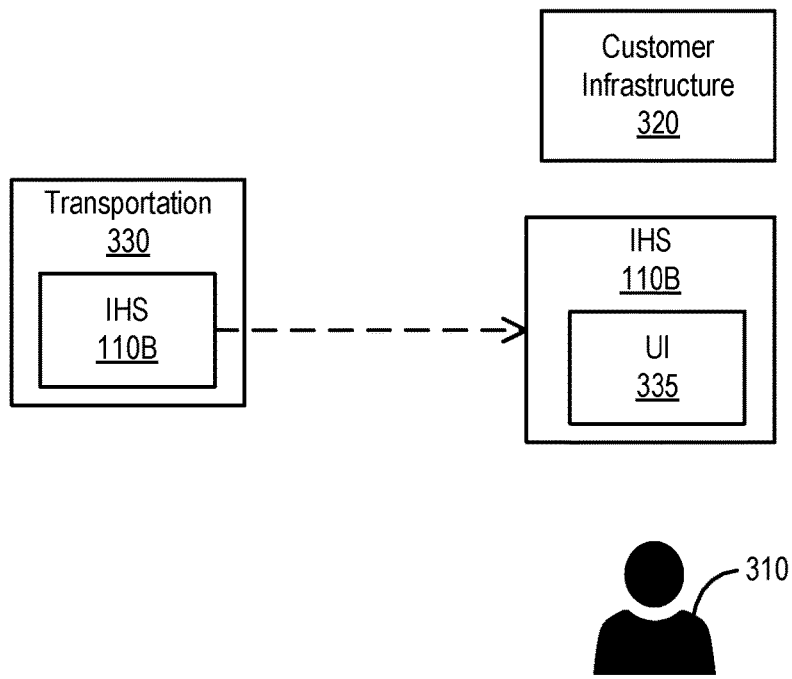
FIG. 3B illustrates an example of a delivery of an information handling system to a customer, according to one or more embodiments.

Turning now to FIG. 3B, an example of a delivery of an information handling system to a customer is illustrated, according to one or more embodiments. As shown, transportation 330 may deliver IHS 110B to customer 310. As illustrated, IHS 110B may include a user interface (UI) 335. In one or more embodiments, UI 335 may include a GUI. In one or more embodiments, UI 335 may display information associated with the order of IHS 110B. For example, UI 335 may display information associated the one or more components of IHS 110B that were ordered. In one or more embodiments, UI 335 may display information associated with actual components of 110B. In one instance, the actual components of 110B may be the components that were ordered. In another instance, the actual components of 110B may not be the components that were ordered. In one or more embodiments, UI 335 may display information associated with one or more differences between the actual components of 110B and the components that were ordered.

Figure 4A:
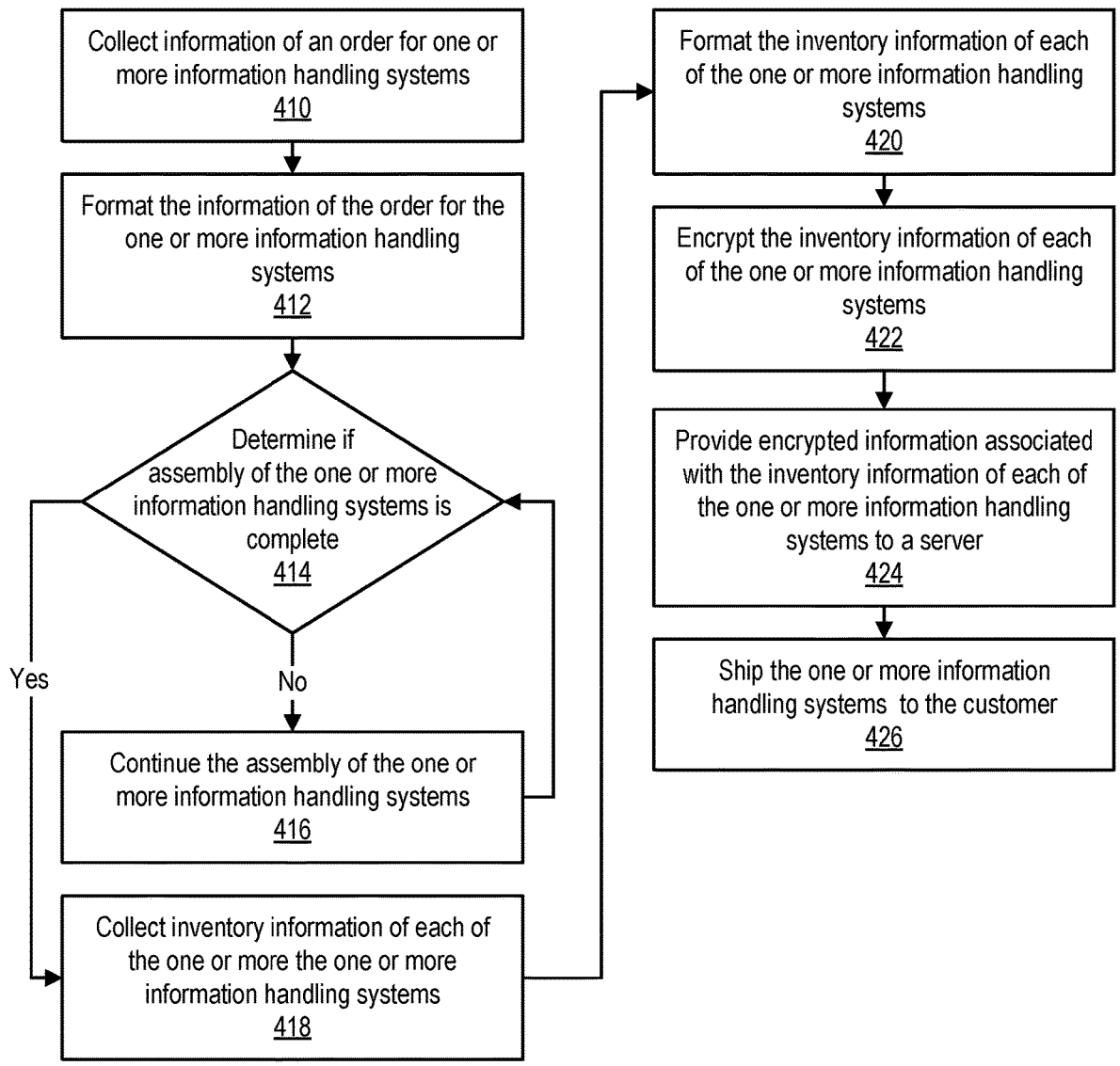
FIG. 4A illustrates a method of operating a manufacture factory, according to one or more embodiments.

Turning now to FIG. 4A, a method of operating a manufacture factory is illustrated, according to one or more embodiments. At 410, factory scripts may collect information of an order for one or more information handling systems (IHSs). For example, manufacturer website 315 may collect information of an order for one or more IHSs 110. At 412, the factory scripts may format the information of the order for the one or more IHSs. For example, manufacturer website 315 may format the information of the order for the one or more IHSs 110. In one instance, manufacturer website 315 may format the information of the order for the one or more IHSs 110 in a JSON format. In one instance, manufacturer website 315 may format the information of the order for the one or more IHSs 110 in a XML format.

At 414, it may be determined if assembly of the one or more IHSs is complete. For example, manufacturer factory 325 may determine if assembly of the one or more IHSs 110 is complete. If the assembly of the one or more IHSs is not complete, assembly of the one or more IHSs may continue, at 416. In one or more embodiments, the method may proceed to 414. If the assembly of the one or more IHSs is complete, inventory information of each of the one or more IHSs may be collected, at 418. At 420, the inventory information of each of the one or more IHSs may be formatted. In one example, the inventory information of each of the one or more IHSs may be formatted in a JSON format. In another example, the inventory information of each of the one or more IHSs may be formatted in a XML format.

At 422, the inventory information of each of the one or more IHSs may be encrypted. For example, the inventory information of each of the one or more IHSs may be encrypted via a private key of the manufacturer. At 424, encrypted information associated with the inventory information of each of the one or more IHSs may provided to a server. In one example, encrypted information associated with the inventory information of each of the one or more IHSs may be provided to a server of the manufacturer. In another example, encrypted information associated with the inventory information of each of the one or more IHSs may be provided to a server of a customer that ordered the one or more IHSs. In one or more embodiments, a server may be included in a cloud computing solution. At 426, the one or more IHSs may be shipped to the customer. For example, shipping the one or more IHSs to the customer may include transporting the one or more IHSs to the customer via a transportation service.

Figure 4B:
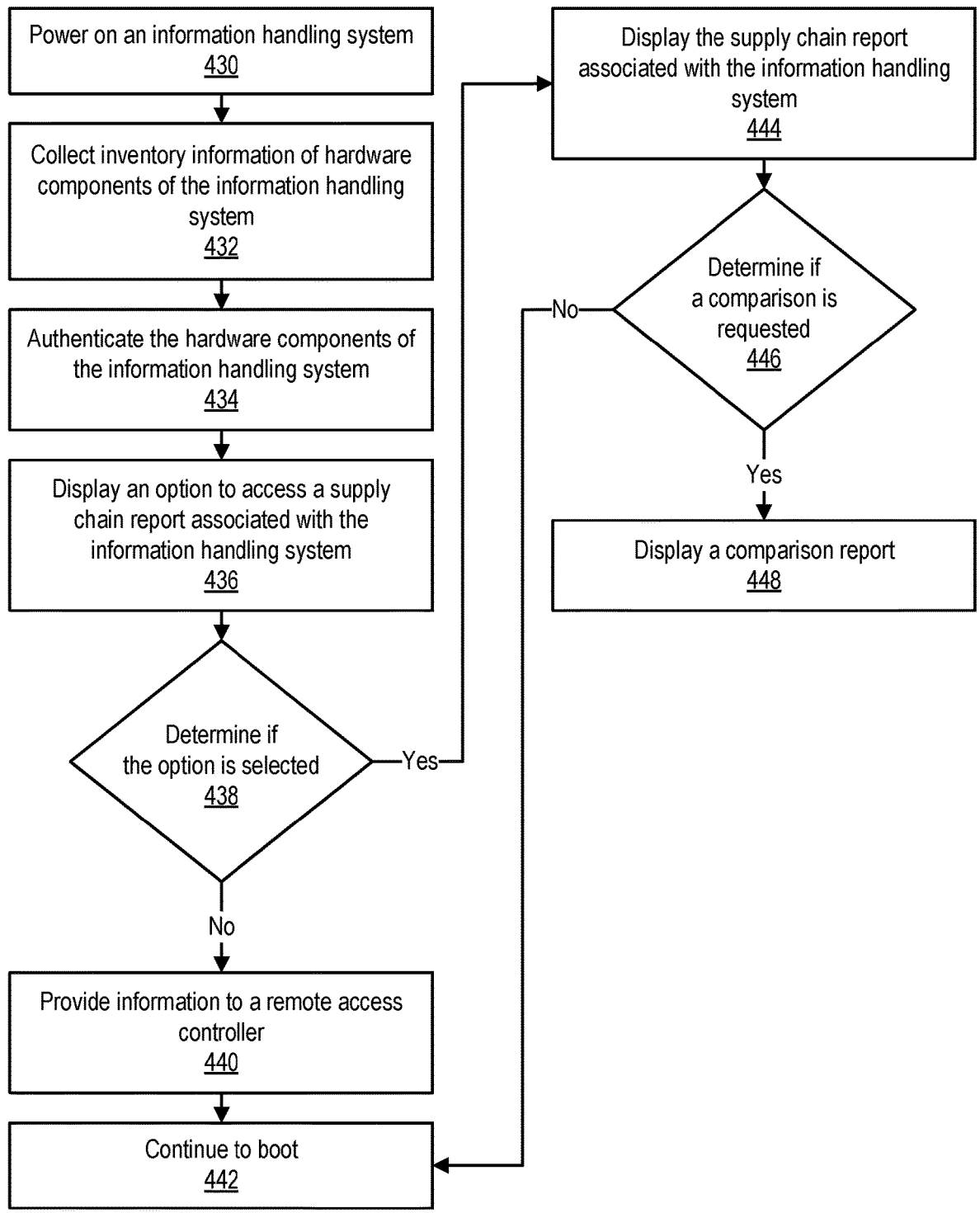
FIG. 4B illustrates a method of operating information handling system firmware, according to one or more embodiments.

Turning now to FIG. 4B, a method of operating information handling system firmware is illustrated, according to one or more embodiments. At 430, an information handling system may be powered on. For example, IHS 110B may be powered on. At 432, inventory information of hardware components of the information handling system may be collected. For example, inventory information may be collected form hardware components, such as processor 120, volatile memory medium 150, non-volatile memory medium 160, non-volatile memory medium 170, network interface 180, and BMC 185, among others, of IHS 110B.

At 434, the hardware components of the information handling system may be authenticated. For example, hardware components, such as processor 120, volatile memory medium 150, non-volatile memory medium 160, non-volatile memory medium 170, network interface 180, and BMC 185, among others, of IHS 110B may be authenticated. At 436, an option to access a supply chain report associated with the information handling system may be displayed. At 438, it may be determined if the option is selected. If the option is not selected, information may be provided to a remote access controller, at 440. For example, the inventory information may be provided to BMC 185. At 442, the information handling system may continue to boot. For example, IHS 110B may continue to boot.

If the option is selected, the supply chain report associated with the information handling system may be displayed, at 444. For example, the supply chain report associated with IHS 110B may be displayed, via a display. At 446, it may be determined if a comparison is requested. If the comparison is not requested, the method may proceed to 442, according to one or more embodiments. If the comparison is requested, a comparison report may be displayed, at 448. For example, the comparison report may be displayed via a display. In one instance, the comparison report may include information displayed by a user interface 510A, as illustrated in FIG. 5A. In a second instance, the comparison report may include information displayed by a user interface 510B, as shown in FIG. 5B. In another instance, the comparison report may include information displayed by a user interface 510C, as illustrated in FIG. 5C.

Figure 4C:
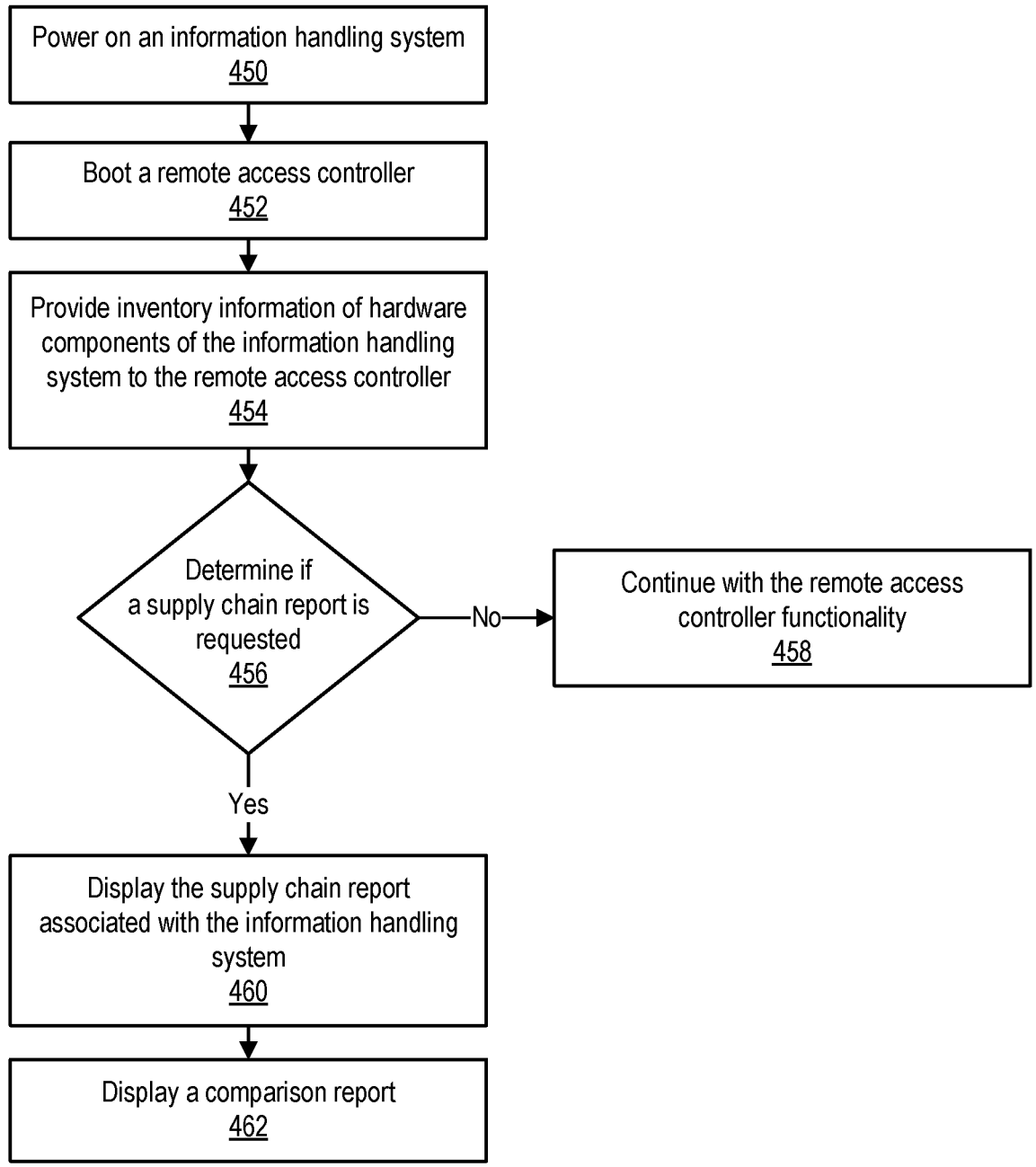
FIG. 4C illustrates a method of operating a remote access controller, according to one or more embodiments.

Turning now to FIG. 4C, a method of operating a remote access controller is illustrated, according to one or more embodiments. At 450, an information handling system may be powered on. For example, IHS 110B may be powered on. At 452, a remote access controller may boot. For example, BMC 185 of IHS 110B may boot. At 454, inventory information of hardware components of the information handling system may be provided to the remote access controller. For example, inventory information associated with one or more of processor 120, volatile memory medium 150, non-volatile memory medium 160, non-volatile memory medium 170, network interface 180, and BMC 185, among others, of IHS 110B may be provided to BMC 185.

At 456, it may be determined if a supply chain report is requested. If the supply chain report is not requested, the remote access controller may continue, at 458. For example, BMC 185 may continue to function. If the supply chain report is requested, the supply chain report associated with the information handling system may be displayed, at 460. For example, the supply chain report associated with IHS 110B may be displayed via a display.

At 462, a comparison report may be displayed. For example, the comparison report may be displayed via a display. In one instance, the comparison report may include information displayed by user interface 510A, as illustrated in FIG. 5A. In a second instance, the comparison report may include information displayed by user interface 510B, as shown in FIG. 5B. In another instance, the comparison report may include information displayed by user interface 510C, as illustrated in FIG. 5C.

Figure 6:
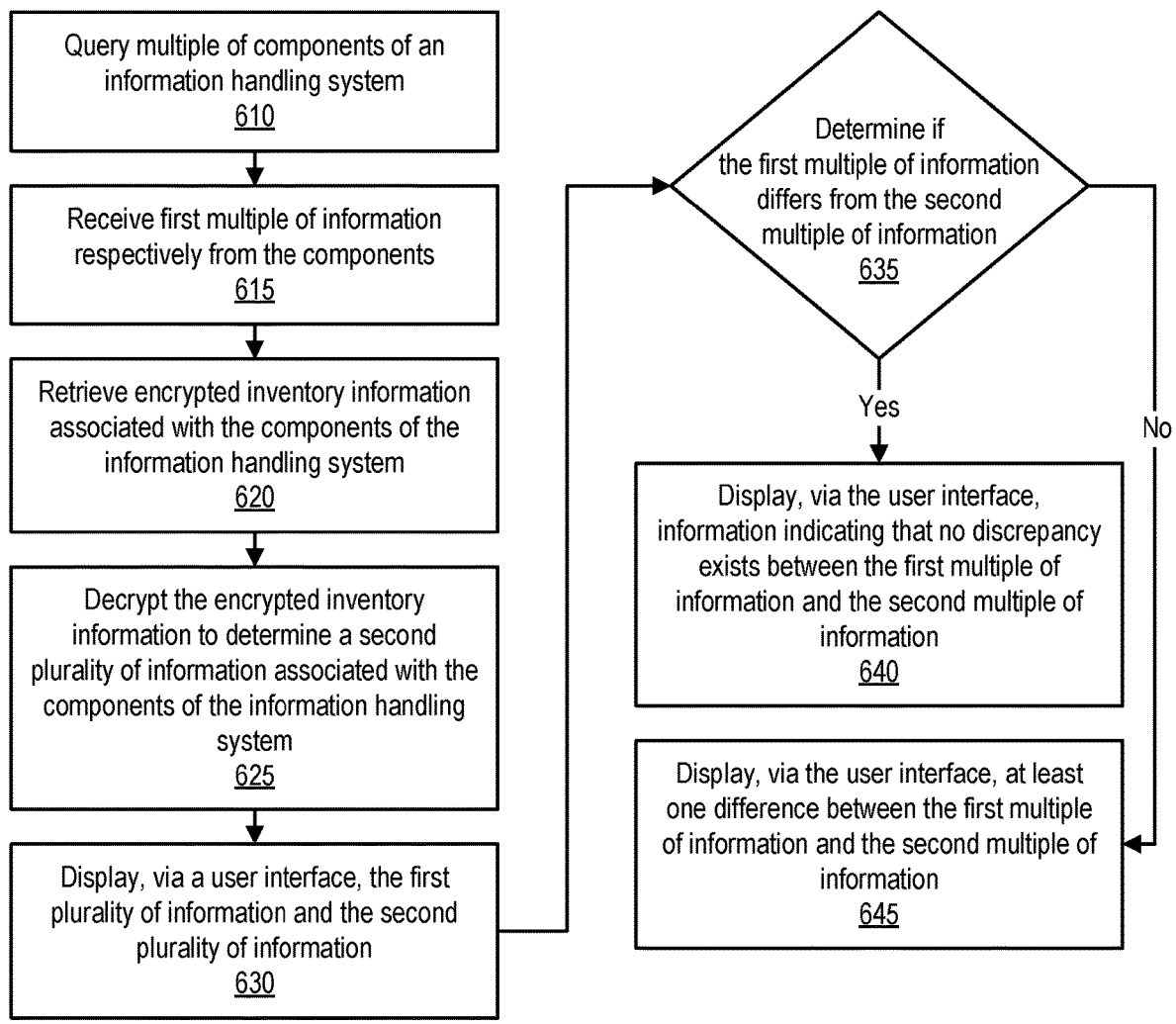
FIG. 6 illustrates an example of a method of operating an information handling system, according to one or more embodiments.

Turning now to FIG. 6, an example of a method of operating an information handling system is illustrated, according to one or more embodiments. At 610, multiple components of an information handling system may be queried. In one example, multiple physical hardware components of IHS 110B may be queried. For instance, multiple of physical hardware components processor 120, volatile memory medium 150, non-volatile memory medium 160, non-volatile memory medium 170, network interface 180, and BMC 185, among others, of IHS 110B may be queried. In another example, multiple firmware components of IHS 110B may be queried.

At 615, first multiple of information may be received respectively from the components. For example, first multiple of information may be received respectively from the two or more of the physical hardware components processor 120, volatile memory medium 150, non-volatile memory medium 160, non-volatile memory medium 170, network interface 180, and BMC 185, among others. In one or more embodiments, information from a hardware component may include an identification. In one example, information from a hardware component may include a serial number. In a second example, information from a hardware component may include model information. In another example, information from a hardware component may include a manufacturer name. In one or more embodiments, information from a firmware component may include an identification. In one example, information from a firmware component may include a serial number. In a second example, information from a firmware component may include version information. In another example, information from a firmware component may include a manufacturer name. In one or more embodiments, an identification of a hardware component may be obtained via communicating with the hardware component. For example, even if an identification of a hardware component may be altered on an external portion of the hardware component, obtaining the identification of the hardware component via communicating with the hardware component may be an authenticated process or may be an accurate process of obtaining the identification of the hardware component.

In one or more embodiments, information from a hardware component may include firmware. For example, a hash value of the firmware may be calculated via a hash function. For instance, the hash function may be a one-way hash function. In one or more embodiments, a one-way hash function may be considered collision free. For example, the one-way hash function may be injective or one-to-one. For instance, $h(z_1)$ and $h(z_2)$ may produce different values, where $z_1$ and $z_2$ are different. In one or more embodiments, a one-way hash function may be considered a cryptographic checksum, a message digest, a digital fingerprint, a message integrity check, a contraction function, a compression function, and/or a manipulation detection code, among others. Examples of one-way hash functions may include one or more of an Abreast Davies-Meyer, a Davies-Meyer, a message digest (MD) 2, a MD 4, a MD 5, a RIPE-MD, a GOST Hash, a N-HASH, a HAVAL, a SHA (secure hash algorithm) (e.g., SHA-1, SHA-2, SHA-3, SHA-256, etc.), and a SNE-FRU, among others. In one or more embodiments, a one-way hash function may be a composite function of two or more one-way hash functions. For example, a function $h_1$ may include a MD 5 one-way hash function $h_2$, a SHA one-way hash function $h_3$, and a MD 5 one-way hash function $h_4$, such that $h_1=h_2(h_3(h_4(z)))$. For instance, a one-way hash function that is a composite function of two or more one-way hash functions may be considered to be and/or said to be strengthened.

At 620, encrypted inventory information associated with the hardware components of the information handling system may be received. In one example, encrypted inventory information associated with the hardware components of the information handling system may be received from a manufacturer information handling system. For instance, the encrypted inventory information associated with the components of the information handling system may be received from manufacturer website 315. In a second example, encrypted inventory information associated with the hardware components of the information handling system may be received from a cloud-based solution associated with a manufacturer of IHS 110B. In a third example, encrypted inventory information associated with the hardware components of the information handling system may be received from customer infrastructure 320. In one instance, the encrypted inventory information associated with the hardware components of the information handling system may be received from an information handling system of customer infrastructure 320. In another instance, the encrypted inventory information associated with the hardware components of the information handling system may be received from a cloud-based solution associated with customer infrastructure 320. In a fourth example, encrypted inventory information associated with the hardware components of the information handling system may be received from non-volatile memory medium 170. For instance, inventory 174 may include the encrypted inventory information associated with the hardware components of the information handling system. In another example, encrypted inventory information associated with the hardware components of the information handling system may be received from non-volatile memory medium 270. For instance, inventory 174 may include the encrypted inventory information associated with the hardware components of the information handling system.

At 625, the encrypted inventory information may be decrypted to determine second multiple of information associated with the components of the information handling system. In one or more embodiments, the second multiple of information associated with the components of the information handling system may be encrypted with a private key of the manufacturer of the information handling system. For example, the encrypted inventory information may be decrypted with a public key of the manufacturer of IHS 110B to determine second multiple of information associated with the components of the information handling system. In one instance, public key of the manufacturer of IHS 110B may be received from a network. In a second instance, public encryption key 176 may be received from non-volatile memory medium 170. In another instance, public encryption key 176 may be received from non-volatile memory medium 270.

At 630, the first multiple of information and the second multiple of information may be displayed via a user interface. In one example, the first multiple of information and the second multiple of information may be displayed via user interface 510A, as illustrated in FIG. 5A. In a second example, the first multiple of information and the second multiple of information may be displayed via user interface 510B, as shown in FIG. 5B. In another example, the first multiple of information and the second multiple of information may be displayed via user interface 510C, as illustrated in FIG. 5C. In one or more embodiments, a user interface 510 may be displayed via a hardware display. In one example, the hardware display may be coupled to the information handling system. In another example, the information handling system may include the hardware display. In one or more embodiments, a user interface 510 may be displayed via a web browser.

At 635, it may be determined if the first multiple of information differs from the second multiple of information. In one example, IHSFW 172 may determine if the first multiple of information differs from the second multiple of information. In another example, BMC 185 may determine if the first multiple of information differs from the second multiple of information.

In one or more embodiments, determining if the first multiple of information differs from the second multiple of information may include determining if information of the first multiple of information differs from information of the second multiple of information. In one example, the information of the first multiple of information may include a first identification, and the information of the second multiple of information may include a second identification. For instance, determining if the first multiple of information differs from the second multiple of information may include determining if the first identification differs from the second identification. In another example, the information of the first multiple of information may include a first hash value, and the information of the second multiple of information may include a second hash value. For instance, determining if the first multiple of information differs from the second multiple of information may include determining if the first hash value differs from the second hash value. In one or more embodiments, the first hash value may be calculated, via a hash function, from firmware of a component of IHS 110B.

If the first multiple of information does not differ from the second multiple of information, information indicating that no discrepancy exists between the first multiple of information and the second multiple of information may be displayed via the user interface, at 640. For example, information indicating that no discrepancy exists between the first multiple of information and the second multiple of information may be displayed via user interface 510A, as illustrated in FIG. 5A.

If the first multiple of information differs from the second multiple of information, at least one difference between the first multiple of information and the second multiple of information may be displayed via the user interface, at 645. In one example, at least one difference between the first multiple of information and the second multiple of information may be displayed via user interface 510B, as illustrated in FIG. 5B. For instance, hashing shown in FIG. 5B may represent a background color that may highlight the at least one difference between the first multiple of information and the second multiple of information. In another example, at least one difference between the first multiple of information and the second multiple of information may be displayed via user interface 510C, as illustrated in FIG. 5C. For instance, hashing shown in FIG. 5C may represent a background color that may highlight the at least one difference between the first multiple of information and the second multiple of information.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor; and
   a memory medium, coupled to the at least one processor, that stores instructions executable by the at least one processor, which when executed by the at least one processor, cause the information handling system to:

query components of the information handling system, including one or more factory scripts identifying the components of the information handling system and formatting data that indicates the components;

receive a first plurality of information respectively from the components, wherein first information of the first plurality of information includes a first hash of firmware associated with a component of the components;

retrieve encrypted inventory information associated with the components of the information handling system;

decrypt the encrypted inventory information to determine a second plurality of information associated with the components of the information handling system, wherein second information of the second plurality of information includes a second hash of firmware associated with the component of the component;

display, via a user interface, the first plurality of information and the second plurality of information;

determine if the first hash differs from the second hash;

if the first hash differs from the second hash, display, via the user interface, at least one difference between the first plurality of information and the second plurality of information; and if the first hash does not differ from the second hash, display, via the user interface, information indicating that no discrepancy exists between the first plurality of information and the second plurality of information.

2. The information handling system of claim 1, wherein, to retrieve the encrypted inventory information associated with the components of the information handling system, the instructions further cause the information handling system to retrieve, via a network, the encrypted inventory information associated with the components of the information handling system from a server.

3. The information handling system of claim 1, further comprising:
a remote access controller coupled to the at least one processor;
wherein, to retrieve the encrypted inventory information associated with the components of the information handling system, the instructions further cause the information handling system to retrieve the encrypted inventory information associated with the components of the information handling system from the remote access controller.

4. The information handling system of claim 1, wherein, to decrypt the encrypted inventory information to determine the inventory information associated with the components of the information handling system, the instructions further cause the information handling system to utilize a public encryption key of a manufacturer of the information handling system.

5. The information handling system of claim 1,
wherein first information of the first plurality of information includes first serial number information associated with the component of the components;
wherein second information of the second plurality of information includes second serial number information associated with the component of the components;
the instructions further including:
determining if the first serial number information differs from the second serial number information;
if the first serial number information differs from the second serial number information, display, via the user interface, at least one difference between the first plurality of information and the second plurality of information; and if the first serial number information does not differ from the second serial number information, display, via the user interface, information indicating that no discrepancy exists between the first plurality of information and the second plurality of information.

6. The information handling system of claim 1, wherein the instructions further cause the information handling system to compute the first hash of the firmware associated with the component of the components from the firmware associated with the component of the components.

7. A method, comprising:
querying components of an information handling system, including one or more factory scripts identifying the components of the information handling system and formatting data that indicates the components;
receiving a first plurality of information respectively from the components, wherein first information of the first plurality of information includes a first hash of firmware associated with a component of the components;
retrieving encrypted inventory information associated with the components of the information handling system;
decrypting the encrypted inventory information to determine a second plurality of information associated with the components of the information handling system, wherein second information of the second plurality of information includes a second hash of firmware associated with the component of the component;
displaying, via a user interface, the first plurality of information and the second plurality of information;
determining if the first hash differs from the second hash;
if the first hash differs from the second hash, displaying, via the user interface, at least one difference between the first plurality of information and the second plurality of information; and
if the first hash does not differ from the second hash, displaying, via the user interface, information indicating that no discrepancy exists between the first plurality of information and the second plurality of information.

8. The method of claim 7, further comprising:
receiving, by a manufacturer via a network, an order for the information handling system, wherein the order includes the inventory of components.

9. The method of claim 7, wherein the retrieving the encrypted inventory information associated with the components of the information handling system includes retrieving, via a network, the encrypted inventory information associated with the components of the information handling system from a server.

10. The method of claim 7, wherein the retrieving the encrypted inventory information associated with the components of the information handling system includes retrieving the encrypted inventory information associated with the components of the information handling system from a remote access controller of the information handling system.

11. The method of claim 7, wherein the decrypting the encrypted inventory information to determine the inventory information associated with the components of the information handling system includes utilizing a public encryption key of a manufacturer of the information handling system.

12. The method of claim 7,
wherein first information of the first plurality of information includes first serial number information associated with the component of the components;
wherein second information of the second plurality of information includes second serial number information associated with the component of the components;

determining if the first serial number information differs from the second serial number information;

if the first serial number information differs from the second serial number information, display, via the user interface, at least one difference between the first plurality of information and the second plurality of information; and if the first serial number information does not differ from the second serial number information, display, via the user interface, information indicating that no discrepancy exists between the first plurality of information and the second plurality of information.

13. A computer-readable non-transitory memory medium that includes instructions that, when executed by at least one processor of an information handling system, cause the information handling system to:

query components of the information handling system, including one or more factory scripts identifying the components of the information handling system and formatting data that indicates the components;

receive a first plurality of information respectively from the components, wherein first information of the first plurality of information includes a first hash of firmware associated with a component of the components;

retrieve encrypted inventory information associated with the components of the information handling system;

decrypt the encrypted inventory information to determine a second plurality of information associated with the components of the information handling system, wherein second information of the second plurality of information includes a second hash of firmware associated with the component of the component;

display, via a user interface, the first plurality of information and the second plurality of information;

determine if the first hash differs from the second hash;

if the first hash differs from the second hash, display, via the user interface, at least one difference between the first plurality of information and the second plurality of information; and if the hash does not differ from the second hash, display, via the user interface, information indicating that no discrepancy exists between the first plurality of information and the second plurality of information.

14. The computer-readable non-transitory memory medium of claim 13, wherein, to retrieve the encrypted inventory information associated with the components of the information handling system, the instructions further cause the information handling system to retrieve, via a network, the encrypted inventory information associated with the components of the information handling system from a server.

15. The computer-readable non-transitory memory medium of claim 13, wherein, to retrieve the encrypted inventory information associated with the components of the information handling system, the instructions further cause the information handling system to retrieve the encrypted inventory information associated with the components of the information handling system from a remote access controller of the information handling system.

16. The computer-readable non-transitory memory medium of claim 13, wherein, to decrypt the encrypted inventory information to determine the inventory information associated with the components of the information handling system, the instructions further cause the information handling system to utilize a public encryption key of a manufacturer of the information handling system.

17. The computer-readable non-transitory memory medium of claim 13, wherein first information of the first plurality of information includes first serial number information associated with component of the components;

wherein second information of the second plurality of information includes second serial number information associated with the component of the components;

the instructions further including:

determining if the first serial number information differs from the second serial number information;

if the first serial number information differs from the second serial number information, display, via the user interface, at least one difference between the first plurality of information and the second plurality of information; and if the first serial number information does not differ from the second serial number information, display, via the user interface, information indicating that no discrepancy exists between the first plurality of information and the second plurality of information.

\* \* \* \* \*